United States Patent
Furuta et al.

(10) Patent No.: US 9,369,261 B2
(45) Date of Patent: Jun. 14, 2016

(54) CIRCUIT FOR BASEBAND HARMONIC REJECTION

(71) Applicants: IMEC, Leuven (BE); RENESAS Electronics Corporation, Kanagawa (JP)

(72) Inventors: Yoshikazu Furuta, Kanagawa (JP); Mark Maria Albert Ingels, Boutersem (BE)

(73) Assignees: IMEC, Leuven (BE); RENESAS Electronics Corporation, Kanagawa (JP)

( * ) Notice: Subject to any disclaimer, the term of this patent is extended or adjusted under 35 U.S.C. 154(b) by 201 days.

(21) Appl. No.: 14/108,745

(22) Filed: Dec. 17, 2013

(65) Prior Publication Data

US 2014/0169237 A1    Jun. 19, 2014

(30) Foreign Application Priority Data

Dec. 19, 2012   (EP) ..................................... 12198069

(51) Int. Cl.
*H04L 27/20* (2006.01)
*H04L 5/14* (2006.01)
*H04B 1/04* (2006.01)

(52) U.S. Cl.
CPC .............. *H04L 5/143* (2013.01); *H04B 1/0475* (2013.01)

(58) Field of Classification Search
CPC ..... H04B 14/046; H04B 1/7136; H04L 27/18
USPC ..................................... 375/308; 455/76, 302
See application file for complete search history.

(56) References Cited

U.S. PATENT DOCUMENTS

| | | | |
|---|---|---|---|
| 6,731,693 B1 | 5/2004 | Damgaard | |
| 2007/0111679 A1 | 5/2007 | Thompson et al. | |
| 2009/0325510 A1* | 12/2009 | Pullela | H03D 7/1441 455/76 |
| 2010/0255868 A1 | 10/2010 | Lee et al. | |
| 2010/0327932 A1 | 12/2010 | Aparin et al. | |
| 2011/0143697 A1 | 6/2011 | Verma et al. | |
| 2012/0322398 A1* | 12/2012 | Pullela | H03D 7/1466 455/302 |

OTHER PUBLICATIONS

Budimir, et al., "Compensation of Nonlinear Distortion in RF Power Amplifiers for Wireless Communications" *19th Telecommunications forum TELFOR 2011*, Serbia, Belgrade, Nov. 22-24, 2011, p. 278-281.

(Continued)

*Primary Examiner* — Daniel Washburn
*Assistant Examiner* — Fitwi Hailegiorgis
(74) *Attorney, Agent, or Firm* — Knobbe, Martens, Olson & Bear, LLP

(57) ABSTRACT

A circuit for reducing counter-intermodulation in a modulated signal caused by an oscillator frequency and harmonics of a baseband signal is disclosed. The circuit comprises a first and a second baseband section arranged for generating a first and a second version of a baseband signal, the second version being phase shifted with respect to the first version. The circuit further comprises three signal paths comprising mixers for multiplication of the first and second version of the baseband signal with a local oscillator signal, so that three upconverted signals with rotated phase with respect to each other are obtained, and arranged for applying a scaling with a scaling factor corresponding to the rotated phases. The circuit further comprises a combination unit arranged for combining the three upconverted signals.

12 Claims, 5 Drawing Sheets

(56) References Cited

OTHER PUBLICATIONS

Mizusawa, et al., "Third- and Fifth-Order Baseband Component Injection for Linearization of the Power Amplifier in a Cellular Phone" *IEEE Transactions on Microwave Theory and Techniques* (Nov. 2005) 53(11): 3327-3334.

Weldon, et al., "A 1.75-GHz Highly Integrated Narrow-Band CMOS Transmitter with Harmonic-Rejection Mixers" *IEEE Journal of Solid-State Circuits* (Dec. 2001) 36(12): 2003-2015.

Xiao, et al., "Digital Baseband Injection Techniques to Reduce Spectral Regrowth in Power Amplifier" *2008 IEEE MTT-S International Microwave Symposium Digest* (Jun. 2008): 1513-1516.

Extended European Search Report dated Jun. 6, 2013, issued in European Patent App. No. 12198069.2, filed on Dec. 19, 2012.

* cited by examiner

CIRCUIT FOR BASEBAND HARMONIC REJECTION

RELATED APPLICATIONS

This application claims priority under 35 U.S.C. §119(a)-(d) to European Patent Application No. EP 12198069.2, filed Dec. 19, 2012, the disclosure of which is hereby incorporated by reference in its entirety.

BACKGROUND

1. Field

The present disclosure is generally related to the field of transmitters for wireless communication, whereby the transmitter is provided with harmonic-rejection means.

2. Description of the Related Technology

Transmitters operable according to some modern wireless communication standards are based on the well-known principles of direct up-conversion as presented in the scheme of FIG. 1. A baseband signal, in FIG. 1 represented with its in-phase and quadrature components I 110 and Q 112, is multiplied with a suitable local oscillator (LO) 140 signal, summed and then applied to a power amplifier (PA) 170.

Due to the increasing demand for communication bandwidth combined with the scarceness of free spectrum, the complexity and versatility of fourth generation (4G) modulation schemes is greater than ever. One type of 4G wireless service is Long Term Evolution (LTE), which is a standard for wireless communication of high-speed data for mobile phones and data terminals. The goal of LTE is to increase the capacity and speed of wireless data networks.

LTE uses Single Carrier Frequency Division Multiple Access (SC-FDMA) based on Orthogonal Frequency Division Multiple Access (OFDMA) technology as the uplink transmission scheme in order to reduce the peak-to-average power ratio (PAPR) of the transmitted signal. In particular, the LTE standard defines multiple RF bands and groups OFDM modulated subcarriers into Resource Blocks (RB) 216 which can be flexibly used within the allocated channel bandwidth 204. A Resource Block 216 consists of 12 OFDM sub-carriers and occupies 180 kHz bandwidth (BW). Multiple resource blocks can be combined contiguously 240 for the uplink (FIG. 2). When the transmit power is concentrated in a single or in a few RB located at a frequency $f_{BB}$ away from LO frequency $f_{LO}$, the transmitter performance may be affected. Counter-intermodulation products (C-IM) originating from the limited linearity of the transmitter's baseband (BB) may fall directly or through cross-modulation due to the non-linearity of the power amplifier into the receive band and degrade the frequency division duplexing (FDD) performance. They may also fall into protected bands and violate spectral emission requirements. More in particular, due to $3^{rd}$ order non-linearity in the transmit path, a counter-IM3 (C-IM3) product appears at the output of the RF circuit at $-3*f_{BB}$ from the LO frequency.

The desired signal and this C-IM3 signal generate intermodulation products in the high power amplifier (PA) 380 following the transmitter. These PA-folded C-IM3 components appear at $+4f_{BB}$ from the wanted signal and $-4f_{BB}$ away from the C-IM3 signal (FIG. 3A). Again these C-IM3 generated products may degrade the FDD performances when disturbing the RX band and/or increase out-of-band spurious emissions, and even violate spectral emission requirements.

Several dominating causes can be indicated for the generation of C-IM3 components. A first and main contribution comes from the baseband $3^{rd}$ order non-linearity. A second contribution is caused by the intermodulation between the wanted signal at RF and the up-converted baseband at the LO's $3^{rd}$ order harmonic.

Concerning the first cause, the following is to be noted. A baseband signal with frequency $f_{BB}$ applied to a non-linear baseband section generates third order harmonic distortion (HD) components (BB HD3). This happens both in the I and in the Q path. As the Q baseband signal has a phase difference of 90 degrees with the I signal, the BB HD3 component of the quadrature signal Q has a phase difference of 270 degrees with the BB HD3 of the in-phase signal I. As illustrated in FIG. 3A, the baseband's harmonic (BB HD3) is up-converted and combined in the mixers. In a typical transmit chain setup, signal swings are kept rather high to maintain a good SNR and in combination with low power supply voltages in nm CMOS it is difficult to obtain an extremely linear baseband circuit. The resulting generation of harmonic components at $f_{LO}-3f_{BB}$ as described above turns out to be a critical issue.

A less important contribution originates in the mixer 350, where up-conversion of the baseband ($f_{BB}$) with the $3^{rd}$ harmonic of the LO signal ($3*f_{LO}$), which is due to the mixing with a square wave, creates a component at $3*f_{LO}-f_{BB}$, that can generate C-IM3 due to intermodulation with the wanted signal at $f_{LO}+f_{BB}$ in the non-linear PA 370 (FIG. 3B). Indeed, one of the intermodulation products of ($3*f_{LO}-f_{BB}$) and ($f_{LO}+f_{BB}$) is located at $(3*f_{LO}-f_{BB})-2*(f_{LO}+f_{BB})$, which is exactly $f_{LO}-3*f_{BB}$, i.e. the same frequency of C-IM3. This is especially true in passive mixers as extensively used in modern modulators, as in these mixers the LO signal is mostly a square wave, which features a significant $3^{rd}$ harmonic.

The C-IM3 described above may further generate components at $f_{LO}+5*f_{BB}$ and $f_{LO}-7*f_{BB}$ through intermodulation with the wanted signal in the subsequent High Power Amplifier (HPA) 380 (FIG. 3C).

These C-IM3 products should be attenuated as much as possible as they degrade the transceiver performance. C-IM3 performance has only recently been recognized as important and only few publications deal with the problem. However, solving the issue in an efficient way gives a clear advantage. A conventional and obvious way to improve C-IM3 performance is by increasing the baseband's intrinsic linearity. However, this increases the design effort and power consumption, which is obviously detrimental for the on-time between battery reloads. Baseband predistortion to compensate the non-linearity is not appropriate, because of the required wider filter bandwidths and the associated penalty in out-of-band noise. An example of compensation by predistortion can be found in U.S. Pat. No. 6,731,693.

As discussed above, the upconversion of the baseband signal with the third order harmonic of the LO, which is due to the mixing with a square wave, is one of the contributors to the C-IM3 problem. There are two well-known techniques to reduce this HD3 component, but they both suffer from the major drawback that they actually only counter the HD3 generated C-IM3 component and do not improve the baseband generated one.

The first is to trap the HD3 by using an LC-notch filter behind the mixers. The introduction of an LC notch filter results in a significant area increase and, even more importantly, a limitation of the RF frequency range in which the transmitter can operate, which is an important disadvantage, especially for 3GPP standards, which cover multiple RF frequency bands. Furthermore, the baseband linearity still needs to be sufficient to avoid direct C-IM3 generation (due to BB HD3).

The other technique consists in the use of harmonic rejection mixers. An example of this approach is given in the paper "A 1.75-GHz Highly Integrated Narrow-Band CMOS Transmitter With Harmonic-Rejection Mixers" (J. A. Weldon et al., IEEE J. Solid-State Circuits, vol. 36, pp. 2003-2015, Dec. 2001), where harmonic rejection mixers are applied at RF frequencies to attenuate the third and fifth order local oscillator harmonics. The principle is illustrated in FIG. 4, where in the mixers 450, 452, 454 (having) the baseband signal is up-converted to RF frequency by means of LO signals with the same frequency but different phase. Thus, the wanted signal is combined from three phases RF1, RF2 and RF3. While the various phases of the wanted signal are combined constructively, the phases of the $3^{rd}$ harmonics of the corresponding LO are such that, when multiplied with the ratio $1-\sqrt{2}-1$ for the various phases, respectively, they cancel each other, and the LO HD3 component is removed. As a result, the baseband is not upconverted to $3*f_{LO}$ (and thus the ($3*f_{LO}-f_{BB}$) product is not generated), and the related C-IM3 mechanism is cancelled. However, this scheme has no impact on the C-IM3 baseband non-linearity related generation and consequently a C-IM3 product due to the presence of BB HD3 component is not eliminated.

Application US2010/255868 presents a solution for controlling the uplink transmit power. In this way high power counter-IM3 signals are avoided. However, the proposed approach rather aims at avoiding the problem by modifying the transmission scheme and RB allocation rather than to improve the transmitter (TX) to allow these transmissions.

In US2011/143697 In-Phase (I) and Quadrature (Q) signals passing from a modem into a direct conversion transmitter are pre-distorted separately from, and independently of, one another. The I signal is pre-distorted to compensate for nonlinearities in the baseband I path circuitry between the modem and the upconverter. The Q signal is pre-distorted to compensate for nonlinearities in the baseband Q path circuitry between the modem and the upconverter. This is similar to traditional predistortion with the corresponding disadvantages described previously. Wide bandwidth in filters results in more power and higher out-of-band noise.

Hence, there is a need for a solution where the C-IM3 generated from the baseband component is reduced so that sensitivity degradation at the receiver is avoided in a FDD scheme and spectral emission masks (out-of-band spectral emission requirements) are respected.

SUMMARY OF CERTAIN INVENTIVE ASPECTS

Certain embodiments have a circuit to counter the generation of C-IM3 products in a modulated signal caused by an oscillator frequency and harmonics of a baseband signal.

The above is accomplished by embodiments according to this disclosure. In a first aspect the disclosure provides for a circuit for reducing counter-intermodulation in a modulated signal caused by an oscillator frequency and harmonics of a baseband signal. The circuit includes a first baseband section configured to generate a first version of a baseband signal. The circuit also includes a second baseband section configured to generate a second version of the baseband signal, the second version being phase shifted with respect to the first version. The circuit also includes three signal paths. Each signal path comprises a mixer for multiplication of the first and second version of the baseband signal with a local oscillator signal. The local oscillator signal in one signal path is a phase-rotated version of the local oscillator signal in the other two signal paths, so that three upconverted signals with rotated phase with respect to each other are obtained. Each signal path also includes a scaling unit configured to apply a scaling factor dependent on the rotated phases. The circuit also includes a combination unit configured to combine the three upconverted signals.

For some implementations, the scaling unit is configured to apply the scaling factor before mixing with the local oscillator signal. For some implementations, the scaling unit is configured to apply the scaling factor to the upconverted signals.

For some implementations, the circuit further includes a power amplifier connected to the first and second baseband section. The first and second baseband section may include an active filter arranged for driving a part of the power amplifier. For some implementations, the scaling unit is configured to apply the scaling factor in the power amplifier. For some implementations, the active filter is a second order low-pass filter. For some implementations, the active filter is followed by an out-of-band noise filter configured to filter out-of-band noise. For some implementations, the out-of-band noise filter is digitally controllable from a voltage supply, the voltage supply voltage higher than a nominal digital voltage. For some implementations, the out-of-band noise filter comprises thick oxide transistors. For some implementations, the mixers are configured to operate with a duty cycle of 25%.

Another aspect of the disclosure provides for a transmitter device comprising the circuit for reducing counter-intermodulation as summarized above and described herein.

Another aspect of the disclosure provides for a circuit for reducing counter-intermodulation in a modulated signal caused by an oscillator frequency and harmonics of a baseband signal. The circuit includes means for generating a first version of a baseband signal. The circuit also includes means for generating a second version of the baseband signal, the second version being phase shifted with respect to the first version. The circuit also includes means for multiplying, on three signal paths, the first and second version of the baseband signal with a local oscillator signal. The local oscillator signal in one signal path is a phase-rotated version of the local oscillator signal in the other two signal paths, so that three upconverted signals with rotated phase with respect to each other are obtained. The circuit also includes means for applying a scaling factor dependent on the rotated phases on each signal path. The circuit also includes means for combining the three upconverted signals.

By providing a solution with only two baseband sections one obtains a practically feasible implementation. One of the baseband signal versions is phase-shifted with respect to the other. The baseband signals are applied in three signal paths where they are mixed with a local oscillator signal. By applying a rotated locator oscillator signal in one of the signal paths one can obtain three upconverted signals with rotated phase with respect to each other. The signal paths are further arranged for applying a scaling with a scaling factor that is related to the rotated phases, as described in detail below. In the combination means the signals obtained from the three signal paths are combined, resulting in a signal with reduced IM3 product.

For purposes of summarizing the disclosure and the advantages achieved over the prior art, certain objects and advantages of the disclosure have been described herein above. Of course, it is to be understood that not necessarily all such objects or advantages may be achieved in accordance with any particular embodiment of the disclosure. Thus, for example, those skilled in the art will recognize that the disclosure may be embodied or carried out in a manner that achieves or optimizes one advantage or group of advantages as taught herein without necessarily achieving other objects or advantages as may be taught or suggested herein.

The above and other aspects of the disclosure will be apparent from and elucidated with reference to the embodiment(s) described hereinafter.

BRIEF DESCRIPTION OF THE DRAWINGS

The disclosure will now be described further, by way of example, with reference to the accompanying drawings, wherein like reference numerals refer to like elements in the various figures.

DETAILED DESCRIPTION OF CERTAIN ILLUSTRATIVE EMBODIMENTS

Figure 1:
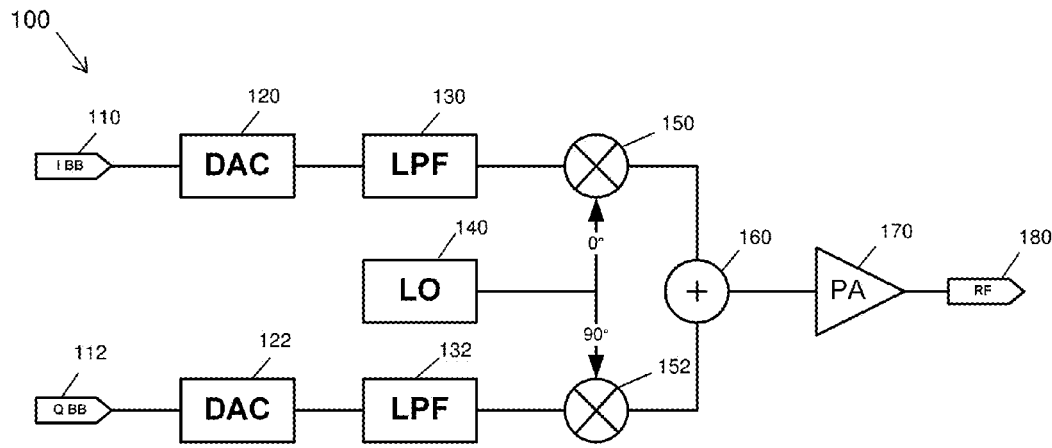
FIG. 1 illustrates a conventional direct up-conversion transmitter scheme.
Figure 2:
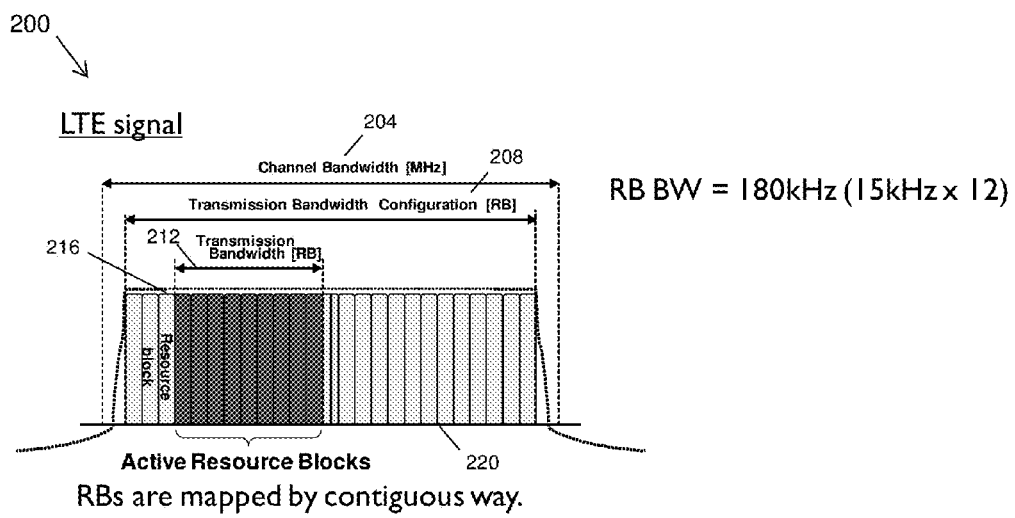
FIG. 2 illustrates various valid RB allocations in LTE.
Figure 2:
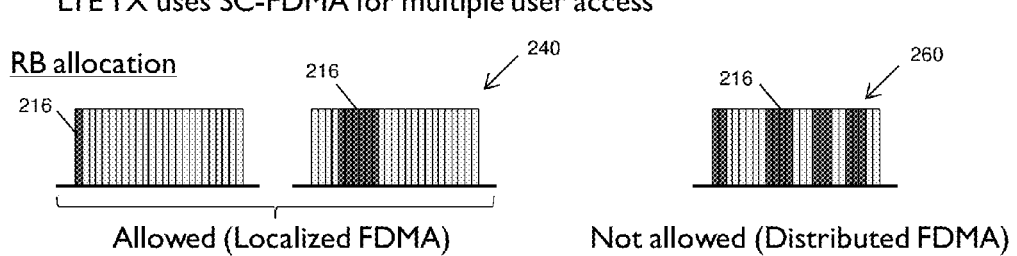
Figure 3A:
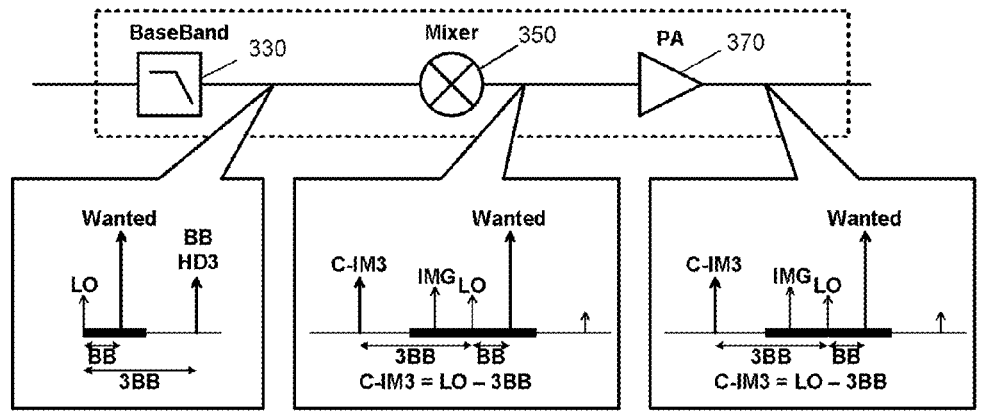
FIG. 3A, FIG. 3B, and FIG. 3C illustrate several C-IM3 generation mechanisms.
Figure 3B:
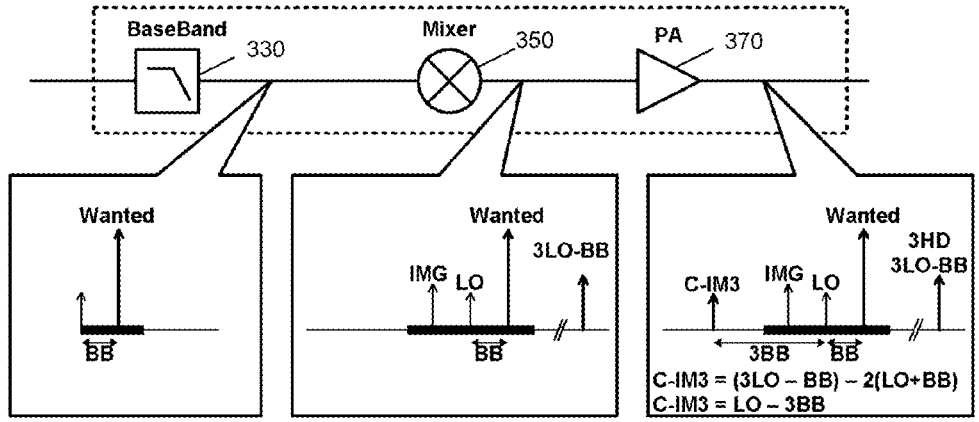
Figure 3C:
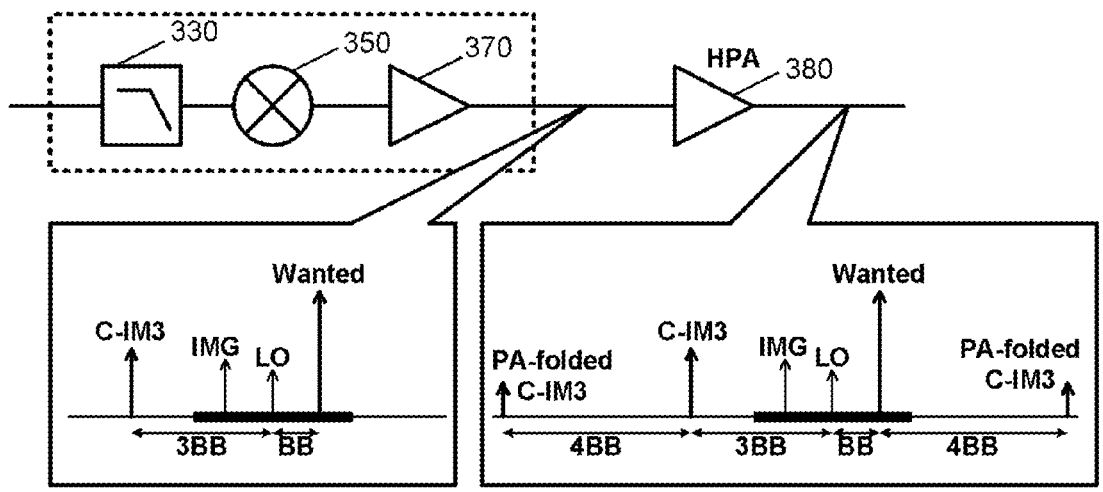
Figure 4:
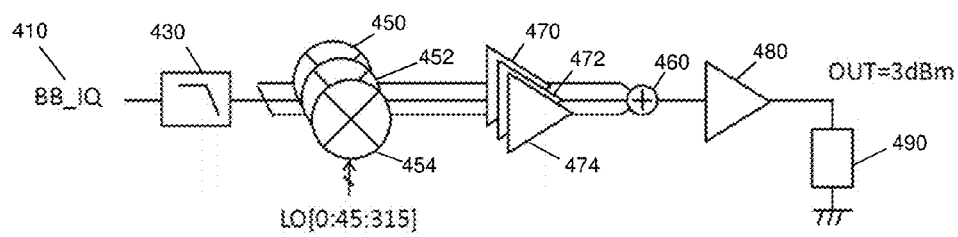
FIG. 4 illustrates the operating principle of a harmonic rejection mixer.
Figure 4:
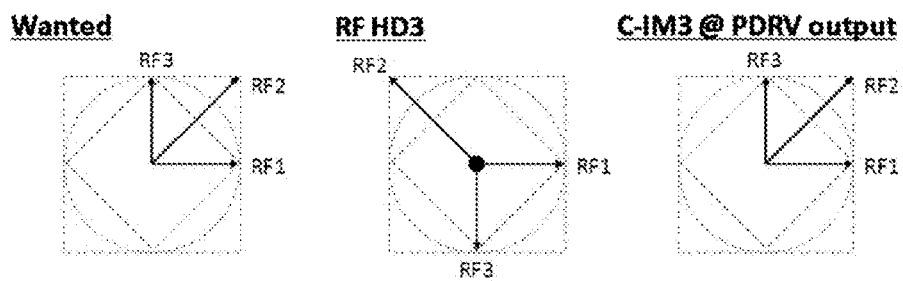

In the following, it should be appreciated that in the description of exemplary embodiments, various features are sometimes grouped together in a single embodiment, figure, or description thereof for the purpose of streamlining the disclosure and aiding in the understanding of one or more of the various inventive aspects. This is however not to be interpreted as the invention requiring more features than those claimed.

Furthermore, while some embodiments described herein include some but not other features included in other embodiments, combinations of features of different embodiments are meant to be within the scope of the invention, and form different embodiments, as would be understood by those skilled in the art.

In the following detailed description, numerous specific details are set forth in order to provide a thorough understanding of the disclosure and how it may be practiced in particular embodiments. However, it will be understood that the present disclosure may be practiced without these specific details. In other instances, well-known methods, procedures and techniques have not been described in detail, so as not to obscure the present disclosure. While the present disclosure will be described with respect to particular embodiments and with reference to certain drawings, the disclosure is not limited hereto. The drawings included and described herein are schematic and are not limiting the scope of the disclosure. It is also noted that in the drawings, the size of some elements may be exaggerated and, therefore, not drawn to scale for illustrative purposes.

Furthermore, the terms first, second, third and the like in the description and in the claims, are used for distinguishing between similar elements and not necessarily for describing a sequential or chronological order. The terms are interchangeable under appropriate circumstances and the embodiments of the disclosure can operate in other sequences than described or illustrated herein.

The term "comprising" should not be interpreted as being restricted to the means listed thereafter; it does not exclude other elements or steps. It is thus to be interpreted as specifying the presence of the stated features, integers, steps, or components as referred to, but does not preclude the presence or addition of one or more other features, integers, steps, or components, or groups thereof. Thus, the scope of the expression "a device comprising means A and B" should not be limited to devices consisting only of components A and B.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed disclosure requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

It should be noted that the use of particular terminology when describing certain features or aspects of the disclosure should not be taken to imply that the terminology is being re-defined herein to be restricted to include any specific characteristics of the features or aspects of the disclosure with which that terminology is associated.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

The present disclosure exploits harmonic cancellation at baseband to reject the third order baseband harmonics and improve the transmitter's C-IM3 performance. The disclosure capitalizes on the harmonic rejection technique as already introduced in the background section.

An harmonic rejection technique in baseband is proposed. The principle is demonstrated conceptually in FIG. 5. In this case the baseband signal is applied to three paths 510, 512, 514 wherein a phase-shifting and scaling is performed on the baseband signal. The phases are rotated over 0, 45 and 90 degrees and scaled with factors 1, sqrt(2) and 1, respectively. The three resulting baseband signals are up-converted in the mixer for each path 550, 552, 554 before being recombined 560. Note that in this case, the phases for the three separate mixers are the normal phases used in the original I/Q upconversion. The wanted signal combines constructively at the output, while third order harmonics of the baseband can ideally be completely suppressed. From the vector diagram at the bottom of FIG. 5, the C-IM3 component after recombination at the output of the mixer indeed has been cancelled. Note that in this case, the HD3 component of the mixer is not cancelled.

As the baseband signal is needed three times, the baseband section of the transmitter could be replicated three times. As the baseband section is the biggest area consumer in the transmitter (unlike the mixer which is relatively small), the combination of three baseband sections would result in an unacceptable increase in area. Furthermore, baseband power consumption would be close to tripled as well.

Figure 5:
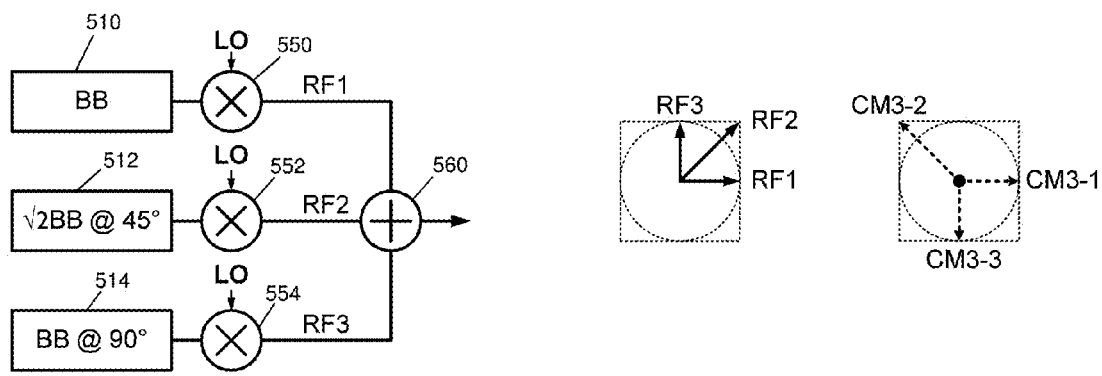
FIG. 5 illustrates the principle of baseband harmonic cancellation.
Figure 6:
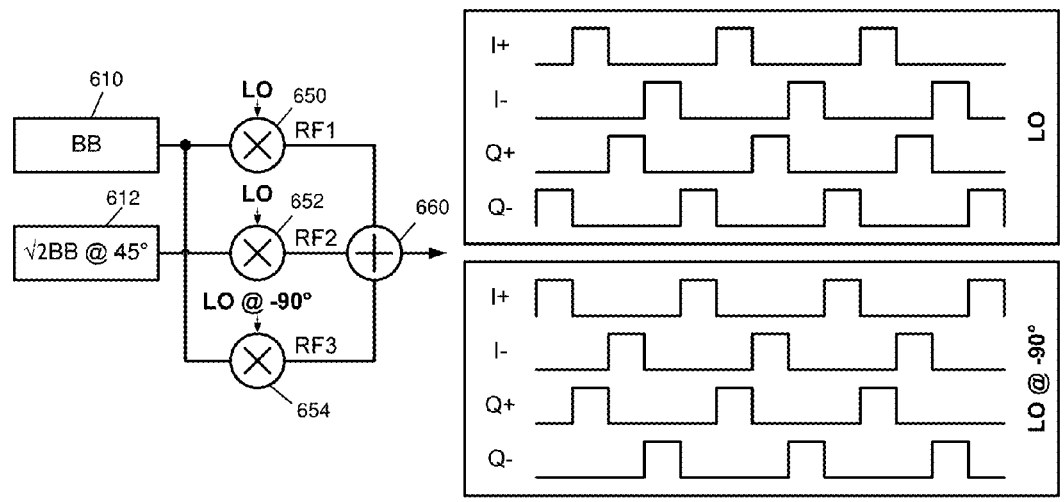
FIG. 6 illustrates an embodiment of the disclosure with baseband harmonic cancellation with phase sharing.

In the proposed approach therefore some modifications have been performed to the existing harmonic rejection scheme of FIG. 5 in order to obtain a practically realizable solution. By carefully examining the quadrature mixing equations and, optionally, combining those with the fact that the mixers may operate on a 25% duty cycle, a simplification is possible, as illustrated in FIG. 6. Some baseband phases can then be reused for various non-overlapping LO phases. Each baseband section is only effectively used during the active phase (high level) of the LO phases connecting to the corresponding mixer. During the non-active part of the LO cycle, the given baseband section is not used and is disconnected from the power amplifier (PA). The mixing product of 90° rotated BB with the I/Q LO may as well be created by multiplying the original BB with −90° rotated LO phases (also true for BB's 3rd harmonics). This −90° rotated LO phase can be created by selecting the correct phases from the existing quadrature LO phases. Hence, the original BB can be re-used during the idle time by sampling it with another LO phase to create the 90° RF component. So, only two BB sections are actually needed: the original BB, which will provide the 0 and 90 degree rotated BB signal after upconversion, and a second 45 degree rotated BB. In this way, it is possible to reduce the overhead needed for the baseband and limit the area extension to a factor 2 instead of 3, as shown in FIG. 6. Due to the proposed reuse of phases and the sharing of the baseband sections the increase in area is limited, which makes the C-IM3 improvement realizable.

Also the linearity requirements of each baseband section are reduced compared to the original single baseband solution. Both active filters drive only part of the PA, and carry smaller signal swings. As a result the power consumption increase due to the doubled baseband is limited. Further, it is to be noted that the original LO phases are used, so no extra LO phases have to be generated.

Figure 7:
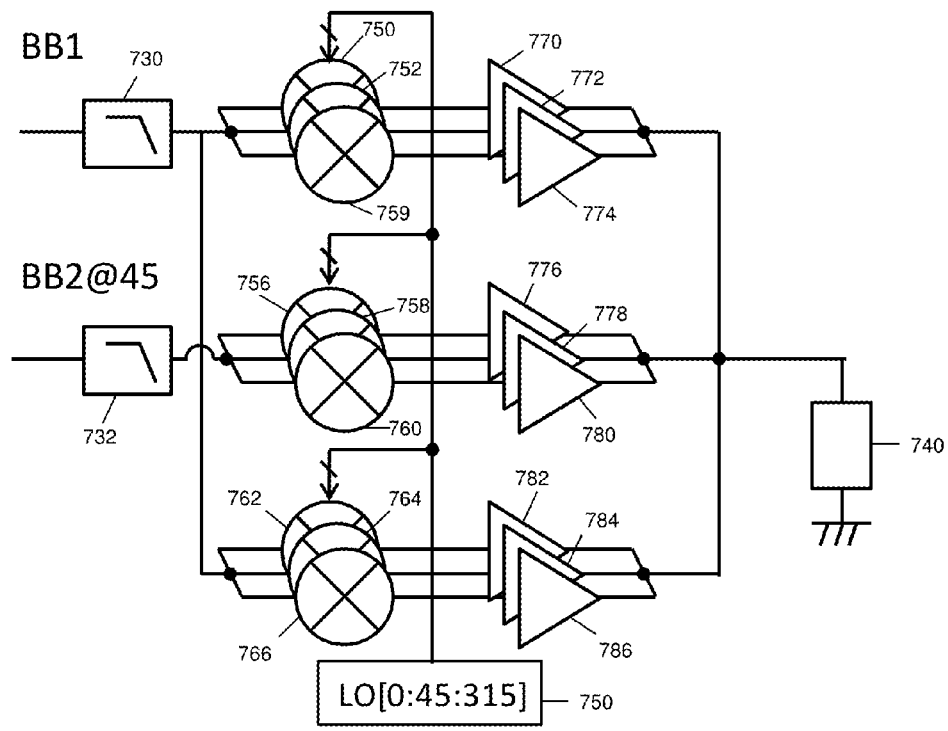
FIG. 7 represents a combination of a circuit according to the disclosure combined with a harmonic rejection mixer.

FIG. 7 illustrates a combination of the circuit of the disclosure with a harmonic rejection mixer to remove both C-IM3 generated from BB HD3 and LO HD3. In this way, the disclosure takes care in removing the baseband HD3 generated C-IM3, while the harmonic rejection mixer cancels the mixer's HD3 component and avoids the related C-IM3 (as previously described).

Figure 8A:
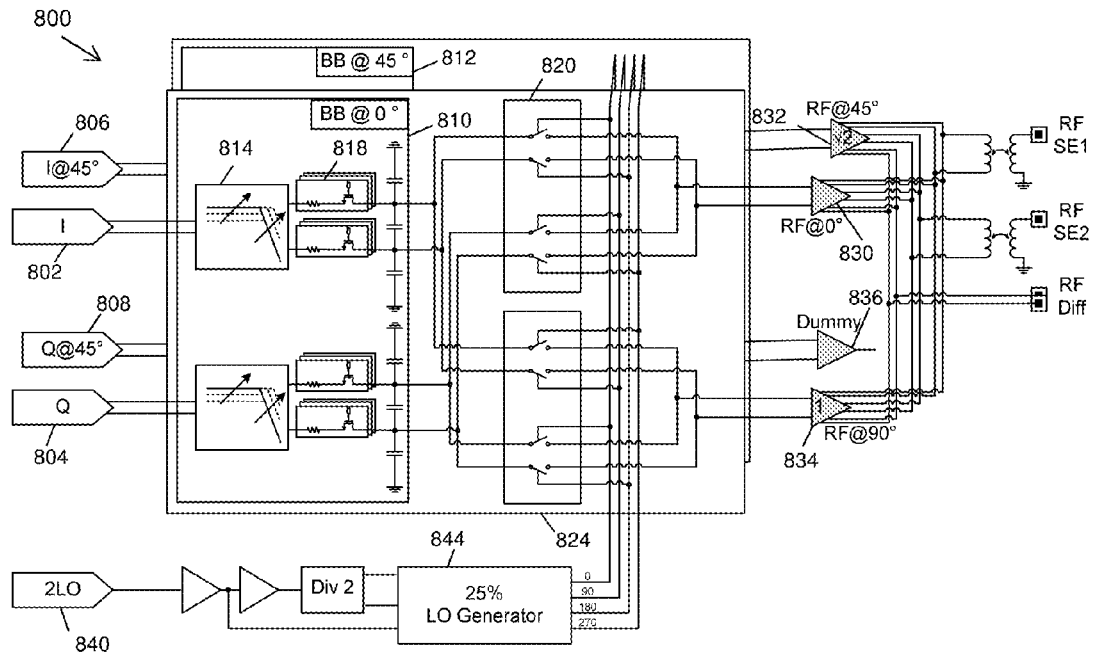
FIG. 8A and FIG. 8B illustrate a transmitter diagram comprising the present disclosure.
Figure 8B:
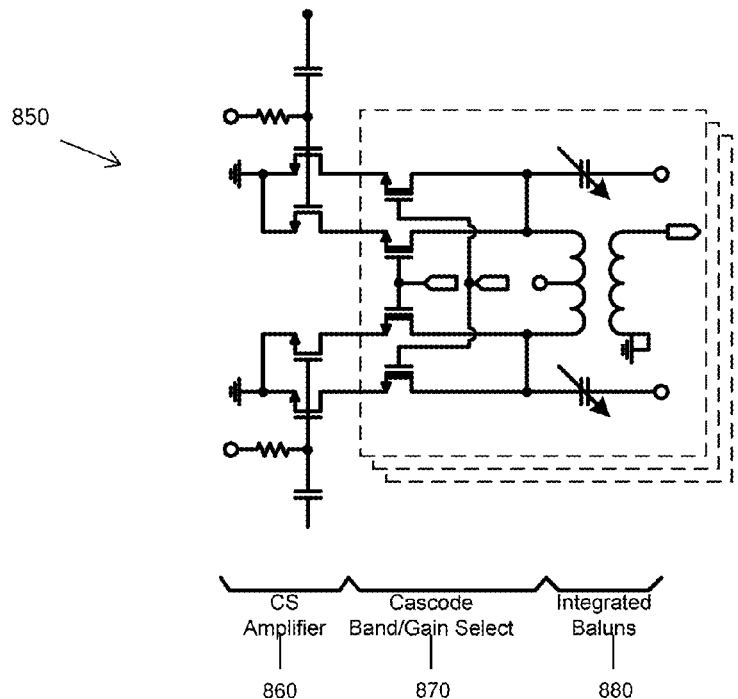

A transmitter block diagram comprising an embodiment of the solution according to the disclosure is presented with the main circuit details in FIG. 8A and FIG. 8B. The baseband sections 810 and 812 each consist of a 1.1V programmable 2nd order active low-pass filter 814 followed by a programmable passive RC filter 818 whose main purpose is to filter out-of-band noise. To avoid linearity degradation due to the switches in the passive poles, the latter are realized with thick oxide transistors and controlled from the 2.5V supply. Two I/Q baseband sections 810 and 812 are implemented. The second one 812 is fed with a 45° rotated baseband signal 806 and 808. This is provided by the DSP and a dedicated DAC. Both baseband sections are identical as the amplitude scaling required for the harmonic rejection is in this embodiment performed in the PA.

The baseband sections are followed by four I/Q voltage sampling mixers 820, 822, 824, and 826 with a 25% duty cycle. Three of these 820, 822, and 824 are effectively used to generate the up-converted 0°, 45° and 90° phases, respectively, while the 4th mixer 826 feeds into a dummy load 836 mimicking the PA's input to avoid mismatch between the various paths.

The 25% duty cycle LO phases are generated by dividing the double frequency LO 840 and combining double and single LO frequency with the adequate logic gate 844. As the 45° phase is provided from the baseband, no supplemental phase has to be generated at the LO, compared to a conventional up-conversion transmitter. The complexity of the routing has increased though and the various LO buffering has been redesigned for low phase noise and power.

The outputs of the three effective mixers 820, 822, 824 are fed to the three Power Amplifiers (PA) 830, 832, 834, respectively, which are relatively scaled with ratios 1, √2 and 1 to achieve the harmonic cancellation. Exact matching of those coefficients is not needed since any reasonable ratio will already lead to a significant C-IM3 reduction. Each PA 850 is a group of small cascoded common source amplifiers 860 in parallel. The thick-oxide cascode transistors control their gain by turning part of the PA on or off. They also redirect the signal to one of both integrated tuned baluns 880 or to the wideband differential output. The outputs of the various small amplifiers are simply added together at their outputs.

As the absolute C-IM3 power decreases when the transmitted power is reduced, it is no longer a problem below a certain transmit power level. Indeed, at lower transmit powers the gain is reduced, amplifying the C-IM3 less, while lower signal levels in the baseband result in lower BB HD3 and thus lower C-IM3. As a result, C-IM3 cancellation is not needed below a certain transmit power level. In the present disclosure, one of the baseband paths can then be turned off, and the remaining operational one can be used as a traditional transmitter. In the given implementation the harmonic rejection can be turned off below −10 dBm output power and the 45° path can be used as main and only signal path. Power consumption is then saved by turning off the corresponding BB 810 and PA sections 830 and 834. Note that the total size of the 3 PA's is similar to the size of a single PA that would provide the same output power, which results in a comparable efficiency.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While various embodiments of the invention have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied, alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

It will be appreciated that, for clarity purposes, the above description has described embodiments with reference to different functional units. However, it will be apparent that any suitable distribution of functionality between different functional units may be used without detracting from the invention. For example, functionality illustrated to be performed by separate computing devices may be performed by the same computing device. Likewise, functionality illustrated to be performed by a single computing device may be distributed amongst several computing devices. Hence, references to specific functional units are only to be seen as references to suitable means for providing the described functionality, rather than indicative of a strict logical or physical structure or organization.

Embodiments of the present disclosure are described above and below with reference to flowchart and block diagram illustrations of methods, apparatus, and computer program products. It will be understood that each block of the flowchart illustrations, and combinations of blocks in the flowchart illustrations, can be implemented by execution of computer program instructions. These computer program instructions may be loaded onto a computer or other programmable data processing apparatus (such as a controller, microcontroller, microprocessor or the like) in a sensor electronics system to produce a machine, such that the instructions which execute on the computer or other programmable data processing apparatus create instructions for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks presented herein.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. A circuit for reducing counter-intermodulation in a modulated signal caused by an oscillator frequency and harmonics of a baseband signal, the circuit comprising:
   a first baseband section configured to generate a first baseband signal comprising a first in-phase component and a first quadrature component;
   a second baseband section configured to generate a second baseband signal, the second baseband signal being phase shifted with respect to the first baseband signal, the second baseband signal comprising a second in-phase component and a second quadrature component being phase shifted from the respective first components; and
   three signal paths, each signal path comprising a mixer for multiplication of the first and second baseband signals with a local oscillator signal, whereby the local oscillator signal in one signal path is a phase-rotated version of the local oscillator signal in the other two signal paths, so that three upconverted signals with rotated phase with respect to each other are obtained, and each signal path further comprising a scaling unit configured to apply a scaling factor dependent on the rotated phases; and
   a combination unit configured to combine the three upconverted signals.

2. The circuit of claim 1, wherein the scaling unit is configured to apply the scaling factor before mixing with the local oscillator signal.

3. The circuit of claim 1, wherein the scaling unit is configured to apply the scaling factor to the upconverted signals.

4. The circuit of claim 1, wherein the mixers are configured to operate with a duty cycle of 25%.

5. A transmitter device comprising a circuit for reducing counter-intermodulation as in claim 1.

6. A circuit for reducing counter-intermodulation in a modulated signal caused by an oscillator frequency and harmonics of a baseband signal, the circuit comprising:
   a first baseband section configured to generate a first baseband signal comprising a first in-phase component and a first quadrature component;
   a second baseband section configured to generate a second baseband signal, the second baseband signal being phase shifted with respect to the first baseband signal, the second baseband signal comprising a second in-phase and a second quadrature component being phase shifted from the respective first components; and
   three signal paths, each signal path comprising a mixer for multiplication of the first and second baseband signals with a local oscillator signal, whereby the local oscillator signal in one signal path is a phase-rotated version of the local oscillator signal in the other two signal paths, so that three upconverted signals with rotated phase with respect to each other are obtained, and each signal path further comprising a scaling unit configured to apply a scaling factor dependent on the rotated phases;
   a combination unit configured to combine the three upconverted signals; and a power amplifier connected to the first and second baseband sections, the first and second baseband sections each comprising an active filter arranged for driving a part of the power amplifier.

7. The circuit of claim 6, wherein the scaling unit is configured to apply the scaling factor in the power amplifier.

8. The circuit of claim 6, wherein the active filter comprises a second order low-pass filter.

9. The circuit of claim 6, wherein the active filter is followed by an out-of-band noise filter configured to filter out-of-band noise.

10. The circuit of claim 9, wherein the out-of-band noise filter is digitally controllable from a voltage supply, the voltage supply voltage higher than a nominal digital voltage.

11. The circuit of claim 9, wherein the out-of-band noise filter comprises thick oxide transistors.

12. A circuit for reducing counter-intermodulation in a modulated signal caused by an oscillator frequency and harmonics of a baseband signal, the circuit comprising:

means for generating a first baseband signal comprising a first in-phase and a first quadrature component;

means for generating a second version of the baseband signal, the second version being phase shifted with respect to the first baseband signal, the second baseband signal comprising a second in-phase component and a second quadrature component being phase shifted from the respective first components; and means for multiplying, on three signal paths, the first and second version of the baseband signal with a local oscillator signal, whereby the local oscillator signal in one signal path is a phase-rotated version of the local oscillator signal in the other two signal paths, so that three upconverted signals with rotated phase with respect to each other are obtained;

means for applying a scaling factor dependent on the rotated phases on each signal path; and means for combining the three upconverted signals.

* * * * *